United States Patent

Marchant

[11] Patent Number: 5,564,743
[45] Date of Patent: Oct. 15, 1996

[54] MULTIPLE STAGE AIR BAG INFLATOR SYSTEM

[75] Inventor: Brent R. Marchant, Ogden, Utah

[73] Assignee: Morton International, Inc., Chicago, Ill.

[21] Appl. No.: 408,356

[22] Filed: Mar. 22, 1995

[51] Int. Cl.$^6$ .................................................. B60R 21/26
[52] U.S. Cl. ........................... 280/741; 280/736; 280/737; 222/3
[58] Field of Search ..................................... 280/736, 737, 280/741, 742, 740, 735; 222/3, 5; 103/530, 531, 202; 422/164–166

[56] References Cited

U.S. PATENT DOCUMENTS

| | | | |
|---|---|---|---|
| 3,672,699 | 6/1972 | DeWindt | 280/735 |
| 3,767,002 | 10/1973 | Gillund | 180/102 |
| 3,767,228 | 10/1973 | Lewis | 280/735 |
| 3,966,224 | 6/1976 | Campbell et al. | 280/735 |
| 4,243,248 | 1/1981 | Scholz et al. | 280/735 |
| 4,620,721 | 11/1986 | Scholz et al. | 280/735 |
| 4,984,651 | 1/1991 | Grosch et al. | 180/268 |
| 4,998,751 | 3/1991 | Paxton et al. | 280/241 |
| 5,031,932 | 7/1991 | Frantom et al. | 280/741 |
| 5,033,390 | 7/1991 | Minert et al. | 280/742 X |
| 5,071,160 | 12/1991 | White et al. | 280/735 |
| 5,074,583 | 12/1991 | Fujita et al. | 280/735 |
| 5,232,243 | 8/1993 | Blackburn et al. | 280/732 |
| 5,330,226 | 7/1994 | Gentry et al. | 280/235 |
| 5,351,988 | 10/1994 | Bishop et al. | 280/737 |

FOREIGN PATENT DOCUMENTS 4146842  5/1992  Japan ............................ 280/736

*Primary Examiner*—Christopher P. Ellis
*Attorney, Agent, or Firm*—Philip C. Peterson; Taylor J. Ross; Gerald K. White

[57] ABSTRACT

A multi-stage air bag inflator includes a housing with at least two separated chambers, each containing gas generating material and an ignition system for activating the material to generate gas for rapidly filling an associated air bag. An internal wall is provided in the housing to form the separated chambers and the wall has a frangible section designed to rupture in response to a predetermined level of gas pressure in one of the chambers providing fluid communication between the chambers. The frangible section is supported against rupture in response to gas pressure in the other gas chamber so that different levels of air bag inflation with gas are possible in response to the severity of the impact.

20 Claims, 4 Drawing Sheets

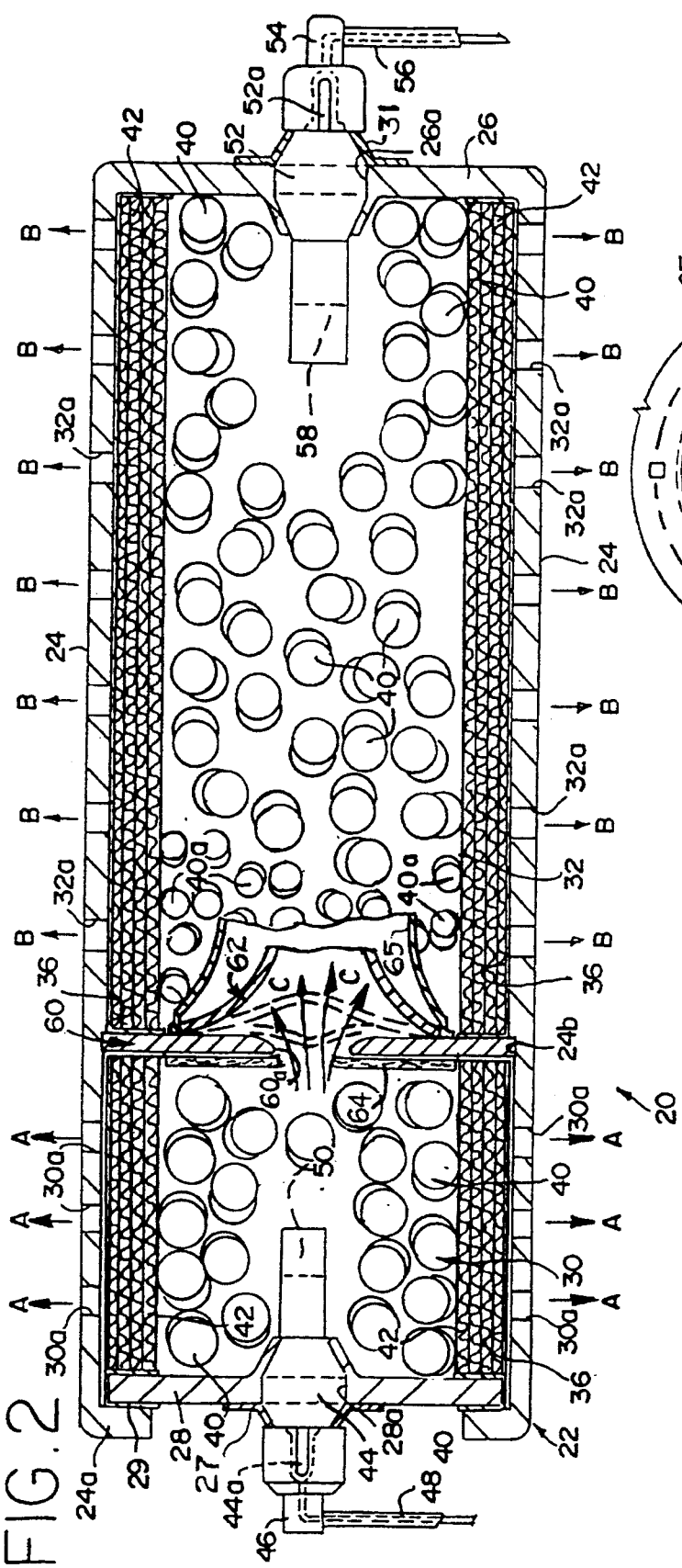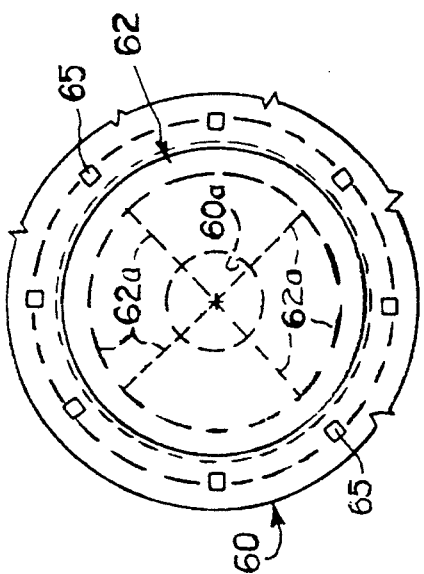

MULTIPLE STAGE AIR BAG INFLATOR SYSTEM

BACKGROUND OF THE INVENTION

1. Field of the Invention

The present invention relates to a new and improved multi-stage air bag inflator which is controlled to generate lower or higher level gas flow dependent on the severity of impact. More particularly, the multi-stage air bag inflator of the present invention has a unitary housing divided by an internal wall into at least two separate chambers with each chamber containing a charge of gas generant material and an ignition system therefor. The internal wall is provided with a frangible wall section which ruptures in response to gas pressure in one chamber but is supported against rupture in response to gas pressure in the other chamber. Thus, in response to one level of impact a single chamber is activated and in response to another level, both chambers are activated.

2. Background of the Prior Art

U.S. Pat. No. 5,330,226, discloses a method and apparatus for detecting an out-of-position occupant for controlling the actuation of a vehicle occupant restraint system having a remote vent valve for venting gas generated by one or both inflators provided for inflating a single air bag restraint.

U.S. Pat. No. 5,074,583, discloses an air bag system for an automobile having a housing for containing a plurality of individually controlled inflators, each having a discharge valve designed to open for inflation of an air bag when a gas pressure of more than a predetermined value is generated.

U.S. Pat. No. 5,232,243 discloses an occupant sensing apparatus for use in an occupant restraint system. The disclosed occupant sensing apparatus preferably monitors the passenger seat in the vehicle to detect the presence on an object in the seat, the position of the object and the weight of the object. A control algorithm is performed to control air bag inflation responsive to the detected values.

U.S. Pat. No. 4,243,248 discloses an air bag system including air bags for the driver and a front seat passenger. In the disclosed air bag system, the passenger side air bag can be inflated in two stages in response to an output signal generated from a sensor system when deceleration reaches first and second thresholds.

U.S. Pat. No. 3,767,228 discloses apparatus for controlling the operation of air bag inflation dependent on ambient temperature within the vehicle in which the apparatus is disposed.

U.S. Pat. No. 5,074,583 discloses an air bag system for an automobile including a seating condition sensor that detects a seating condition of a passenger with respect to seat position, reclining angle, passenger size and posture. The air bag is operated in accordance with the seating condition of the passenger so that the inflated air bag is brought into optimal contact with the occupant.

U.S. Pat. No. 4,984,651 discloses a passenger restraint system for motor vehicles including a switch member that detects the functional position of the safety belt. Activation of an air bag and a belt tensioner is dependent on the functional position of the safety belt.

U.S. Pat. No. 4,998,751 discloses a two stage automotive gas bag inflator using igniter material to delay second stage ignition having two compartments with igniter material in a second compartment which burns slower than that in the first compartment.

U.S. Pat. No. 5,071,160 discloses a sensor for detecting the position of the passenger to effect deployment of the air bag to provide optimum protection for the passenger.

U.S. Pat. No. 3,672,699 discloses an automatic restraint system arming control of an air bag dependent on the presence of an occupant to effect inflation of the air bag. If no occupant is present, the air bag is not inflated.

U.S. Pat. No. 4,620,721 discloses an air bag system that also is responsive to the driver's use of a seat belt. The difference is that the threshold speed differs depending on the driver's use of the belt.

U.S. Pat. No. 3,767,002 discloses a seat occupancy responsive air cushion actuation and monitoring circuit that determines passenger occupancy before firing a squib which controls inflation of the air bag.

U.S. Pat. No. 3,966,224 discloses a multiple inflation rate air bag system using an air-augmented inflator which is activated in various manners in accordance with the occurrence of predetermined levels of intensity of impact to provide the multiple rates of inflation.

OBJECTS OF THE INVENTION

It is an object of the present invention to provide a new and improved multi-stage air bag inflator system that functions optimally over a larger range of crash situations and better than is currently possible with known air bag inflator systems.

It is another object of the present invention to provide a new and improved multi-stage air bag inflator.

It is yet another object of the present invention to provide a new and improved multi-stage air bag inflator having selectively controllable performance characteristics to provide a multiple level energy absorptive capability.

Still another object of the present invention is to provide a new and improved multiple stage air bag inflator system capable of managing the mass flow of gas to inflate an air bag cushion to provide a timely applied, level of restraint capability.

BRIEF SUMMARY OF THE PRESENT INVENTION

The foregoing and other objects and advantages of the present invention are accomplished in a new and improved multiple-stage, air bag inflator system having an inflator including a housing having gas discharge ports in direct communication with an air bag to be inflated. The housing includes at least two separated chambers, each containing a quantity of gas generating material for producing gas and an ignition system therefor for rapidly inflating the air bag. The housing has an internal wall forming the separated chambers and provided with a frangible section which ruptures in response to gas pressure generated in one chamber but which is supported against rupture from gas generated in the other chamber. The ignition system in one or more chambers is activated to provide a selected amount of gas for inflation of the air bag from either one or both chambers. Also, a time delay between activating multiple ignition systems is identified responsive to an identified crash type.

BRIEF DESCRIPTION OF THE DRAWINGS

For a better understanding of the present invention, reference should be had to the following detailed description taken in conjunction with the drawings, in which:

FIG. 2 is a cross-sectional view similar to FIG. 1 but illustrating another operative condition wherein gas generant material in both chambers has been activated for providing a maximum flow of gas;

FIG. 3 is a transverse cross-sectional view taken substantially along lines 3—3 of FIG. 1;

DETAILED DESCRIPTION OF A PREFERRED EMBODIMENT OF THE INVENTION

Figure 1:
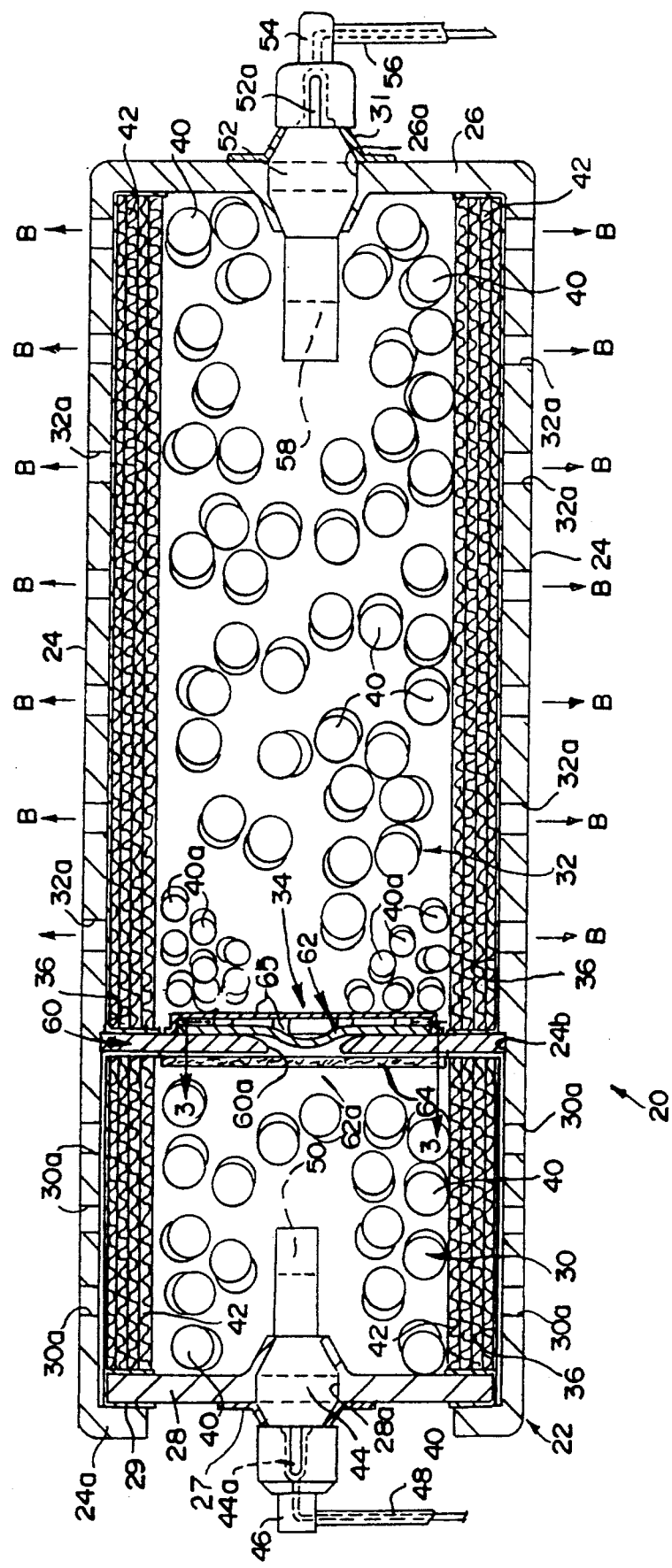
FIG. 1 is a cross-sectional view of a new and improved multi-stage air bag inflator system in accordance with the present invention shown in an operative condition wherein gas generant material in only one of the separate chambers is activated for obtaining a minimum flow of gas for inflating an air bag.

Referring now more particularly to FIGS. 1 and 2, therein is illustrated a new and improved, multistage air bag inflator 20 constructed in accordance with the features of the present invention and especially designed for use in an air bag system 10 providing both variable timing and variable inflation levels. In particular, the multiple-stage inflator 20 is designed to fill a need for multiple pulse deployment of an air bag which is tailored to sensed conditions and severity of impact.

The inflator 20 includes an elongated generally cylindrical metal housing 22 having a hollow tubular side wall 24 closed at one end by an integrally formed circular end wall 26 and at an opposite end by an annular end wall or disk 28 secured in place by a radially inwardly directed crimp-formed end flange 24a integral with the open end of the tubular side wall. An annular seal ring 29 is provided between an inner annular face of the flange 24a and a marginal peripheral portion around the outer face of the end wall disk 28.

In accordance with the present invention, the interior of the housing or canister 22 is divided into at least two separate chambers or compartments 30 and 32 by an internal wall structure 34. Each chamber has a plurality of gas discharge ports 30a and 32a, respectively, for directing gas radially outwardly as indicated by the respective Arrows "A" and "B" for rapidly inflating an associated air bag (not shown) in communication therewith. An inside wall surface of the tubular side wall 24 of each chamber 30 and 32 is provided with an adhesively applied thin foil sealing sheet 36 for hermetically sealing off the interior of the canister 22 at the discharge ports 30a and 32a against the entry of unwanted contaminants from outside the canister. When internal gas pressure is generated in the respective chambers 30 and 32 upon activation of the inflator, the sealing sheet 36 is easily ruptured to open the gas ports 30a and 32a for a rapid outflow of gas to inflate the air bag.

Each separate chamber 30 and 32 contains a charge of solid gas generant material in the form of pellets or wafers 40 formed of sodium azide or other materials which when ignited rapidly provide a relatively large volume of non-toxic gas for air bag inflation. Each chamber 30 and 32 is also provided with a tubular gas filter 42 formed of one or more layers of metal screening material, porous ceramic material or other types of filter media for removing hot slag and particulates from the gas generated from the pellets 40 before it exits the respective gas discharge ports 30a and 32a.

The first and second chambers 30 & 32, as shown are smaller and larger, respectively. However, this proportionality is a variable, within the present invention which may change. For example, the first chamber 30 may be smaller than the second chamber 32, as shown in FIG. 1. The first and second chamber may be equal in size, or the first chamber may be larger than the second chamber.

The first separate combustion chamber 30 is provided with an electrically activated ignition squib 44 sealingly mounted in a central opening 28a of the end wall disk 28 and held in place by an annular element 27 attached to the disk around the periphery. The ignition squib 44 includes outwardly protruding electrical terminals 44a adapted to be connected via a terminal socket 46 to electrical leads 48 for supplying an electrical ignition signal from a sensing and control system described hereinafter. The squib 44 may also include a container 50 of ignition enhancing material such as $BKNO_3$. When the squib is electrically activated by a signal pulse, the ignition process is enhanced and intensified so that pellets 40 are rapidly ignited to generate a quantity of inflation gas for rapidly inflating an air bag.

The separate, second combustion chamber 32 is provided with a separate ignition squib 52 having external terminals 52a adapted for interconnection with a sensing and control system via a connector 54 and electrical leads 56. The squib 52 may also include a container 58 of ignition enhancing material such as $BKNO_3$. The squib 52 is sealingly mounted in a central opening 26a in the integrally formed end wall 26 of the canister 22 and is held in place by an annular element 31 attached to the end wall around the periphery.

In accordance with the present invention the internal divider wall structure 34 which separates the first and second chambers 30 and 32 in the canister 22, includes a strong, metal, annular backing ring 60 having an outer peripheral edge portion snap-fitted or otherwise secured into a shoulder surface 24b formed on the inside surface of the tubular side wall 24 of the canister 22. The metal backing ring 60 is formed with a central opening 60a for allowing gas pressure to communicate and rupture a thin, metal, circular-shaped burst disk 62 (FIG. 2) upon ignition of the gas generant material 40 in the first chamber 30.

Due to the relatively small diameter of the central opening 60a in the backing structure 60, the burst disk 62 remains unruptured when the gas generant material 40 in the second chamber 32 is ignited and the burst disk maintains the pressurization in the second chamber 32 without allowing pressure communication to the first chamber 30 (FIG. 1). Because of the relatively large area behind the burst disk 62, the disk is ruptured by gas pressure upon ignition of the gas generant material 40 in the first chamber 30. The hot gases from the first chamber 30 then flow through the opening 60a and the ruptured burst disk 62 to cause ignition of the gas generant 40 in the second chamber 32. A layer of heat insulating material 64 which need not be impervious to the gases, and which provides negligible structural support, is mounted in the first chamber 30 against the backing disk 60 to provide heat insulation for preventing heat generated from the ignition of material 40 in the second chamber 32 from causing ignition of the material 40 in the first chamber 30. When the first and second chambers 30 and 32 are equal in size or the first chamber 30 is larger than the second chamber 32, the burst disk 62 may be placed in the first chamber.

As shown in FIG. 3, the burst disk 62 is formed with score lines or grooves 62a on the right hand face thereof for facilitating fracture or bursting of the disk 62 (FIG. 2) in response to a greater gas pressure present in the first chamber 30 than in the second chamber 32. This situation occurs when the ignition squib 44 is activated first to generate gas from the generant pellets 40 in the first chamber 30 prior to the ignition of the gas generant pellets 40 in the second chamber 32. The higher gas pressure in the first chamber 30 moves through or ruptures the heat insulating layer 64 and then passes through the central opening 60a in the annular backing member 60 to the full area on the back side of the burst disk 62 causing the disk to deflect (dotted lines, FIG. 2) and ultimately burst open or fracture as shown. Fracture of the disk 62 is facilitated by the weakening grooves 62a and because of the lack of structural support or backing for the burst disk in the second chamber 32.

The hot products of combustion from the gas generant pellets 40 in the first chamber 30 flow into the second chamber 32 as indicated by the Arrows "C" (FIG. 2) causing the gas generating pellets 40a in the immediate vicinity of the internal wall structure 34 to be ignited. This action eventually results in the ignition of all of the gas generant material 40 in the second chamber 32 and produces a maximum volume of gas but with a time delay occurring between the first ignition of the material 40 in the first chamber 30 and the later gas ignition pulse emanating from the ignition of the gas generant material 40a and 40 in the second chamber 32.

In order to further facilitate the fracture of the thin burst disk 62, a circular spacer 65 may be provided in the large chamber 32 spaced away from the burst disk 62. This spacer prevents the gas generant material 40 from pressing directly against the burst disk 62 and thereby providing support therefor for resisting bursting action caused by gas pressure from the small chamber 30. The spacer 65 itself is relatively fragile and is easily broken by the bursting disk 62 acting under pressure from the first chamber 30.

When the ignition squib 52 in the second chamber 32 is activated first, the gas pressure generated in the chamber is not sufficient to fracture the burst disk 62 to provide gas flow into the smaller chamber 30 because the burst disk is well supported on the left hand side (FIG. 1) by the backing or supporting structure 60. Moreover, the heat generated from the process of combustion in the second chamber 32 is not effective to initiate combustion of the generant material 40 in the first chamber 30 because of the layer of heat insulating material 64.

After a first ignition in the second chamber 32 has begun the material 40 in the first chamber 30 may be ignited when desired by an electrical signal or pulse sent to the ignition squib 44. Timing between the ignition signals to the respective ignition squibs 52 and 44 may be selectively controlled by the sensing and control system hereinafter described to obtain the desired pulsed inflation characteristic for the air bag.

Figure 4:
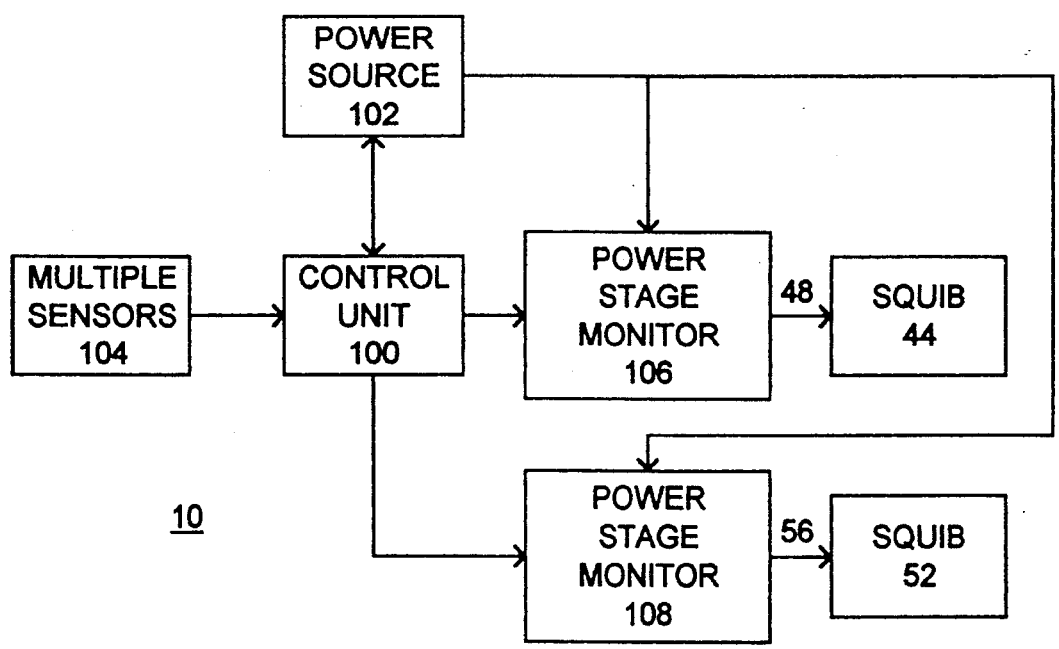
FIG. 4 is a block diagram representation of an air bag system of the invention used with the air bag inflator of FIG. 1.

Referring now to FIG. 4, there is shown a block diagram representation of the air bag system 10. Air bag system 10 includes an electronic control unit 100, a power source 102 and a plurality of sensors represented by multiple sensors block 104 coupled to the electronic control unit 100. Electronic control unit 100 is suitably programmed to perform the control functions of the invention as illustrated and described with respect to FIG. 5. A pair of power stage and monitor blocks 106 and 108 are coupled to the ECU 100 and power source 102 and are connected to a respective one of the inflator control devices or squibs 44 and 52 via the electrical lines 48 and 56. Power stage and monitor blocks 106 and 108 are capable of supplying energy to the squibs 44 and 52. The monitor function included within the power stages 106 and 108 monitors failure modes of the power stages and subsequent gas generation squibs 44 and 52. The multiple sensors 104 advantageously include an acceleration sensor; a temperature sensor driver; a temperature sensor passenger; a buckle switch driver; a buckle switch passenger; an out-of-position sensor driver; an out-of-position sensor passenger and an optional seat occupancy sensor passenger.

U.S. patent application. Ser. No. 08/149,296, filed Oct. 29, 1993, entitled AIR BAG SYSTEM FOR A MOTOR VEHICLE, now U.S. Pat. No. 5,411,289, issued May 2, 1995, discloses an air bag system for a motor vehicle including an electronic control unit, power source and the above-listed multiple sensors used in conjunction with multiple level gas generation sources. The subject matter of the above-identified patent application is incorporated herein by reference.

Figure 5:
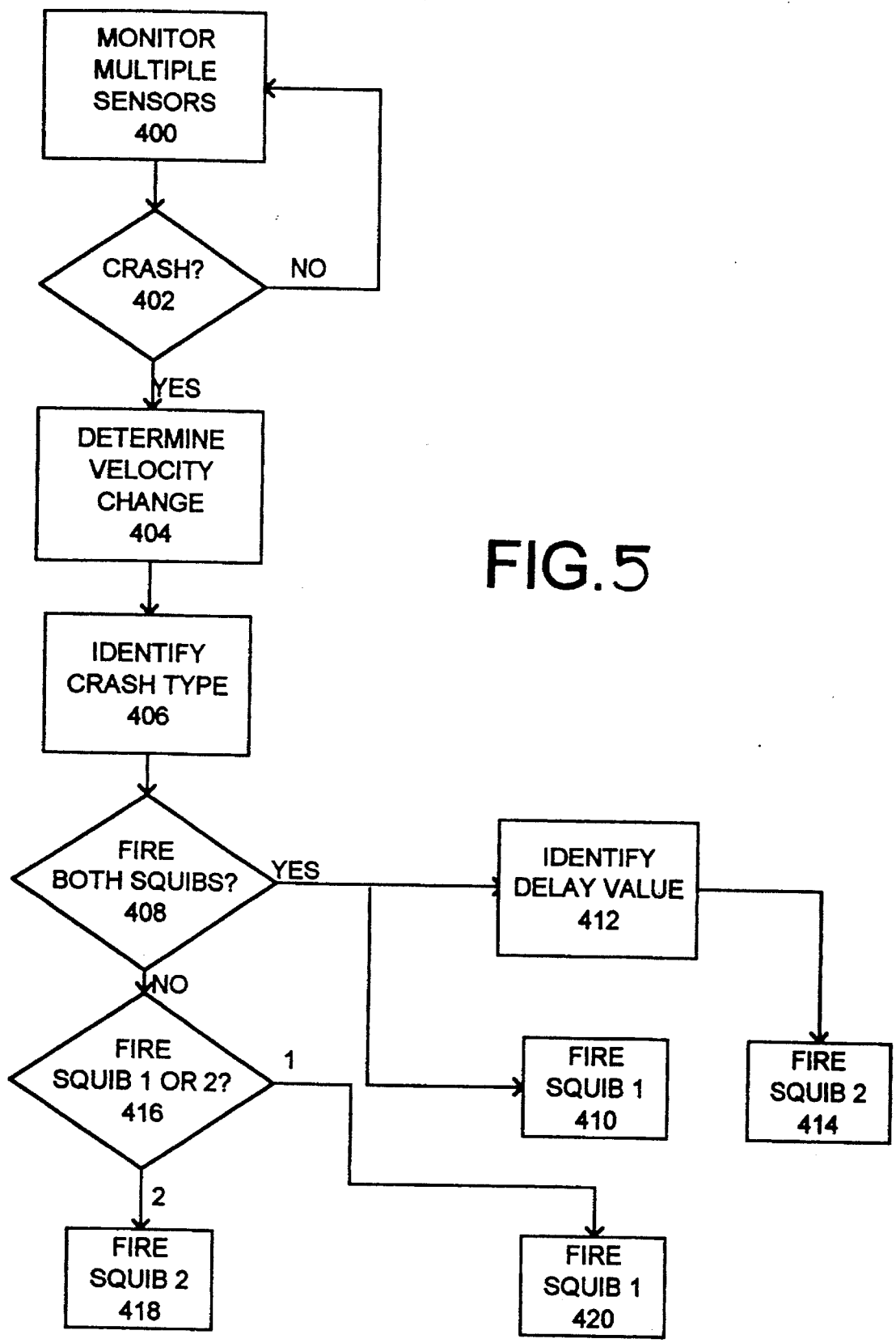
FIG. 5 is a flow chart illustrating sequential steps performed by an electronic control unit of the air bag system of FIG. 4 in accordance with the present invention.

Referring now to FIG. 5, there is shown a flow chart illustrating sequential steps performed by the electronic control unit (ECU) 100. Sequential operations begin with the ECU 100 monitoring the multiple sensors 104 as indicated at a block 400. ECU 100 utilizes the monitored sensor inputs to identify a crash occurrence as indicated at a decision block 402. When a crash is identified at decision block 402, then ECU 100 determines a velocity change of the vehicle at a block 404. Then ECU 100 identifies the crash severity or type as indicated at a block 406. Next ECU 100 determines whether both squibs 1 and 2 (corresponding to squibs 44 and 52) should be activated or fired as indicated at a decision block 408. If determined that both squibs should be fired, then ECU 100 fires squib 1 as indicated at a block 410 and identifies a selected time delay value at a block 412. After the selected time delay, for example, from zero to 50 milliseconds, then ECU 100 fires squib 2 as indicated at a block 414.

Otherwise, when determined that firing both squibs 1 and 2 is not needed at decision block 408, then ECU 100 determines which of the squibs 1 or 2 should be fired as indicated at a decision block 416. When squib 2 is identified as the appropriate inflator control, ECU 100 fires the identified squib 2 as indicated at a block 118 labelled FIRE SQUIB 2. When squib 1 is identified as the appropriate inflator control, ECU 100 fires the identified squib 1 as indicated at a block 120 labelled FIRE SQUIB 1.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A plural stage air bag inflator, comprising:
   a housing having a plurality of separated chambers, each having a volume, each same volume being substantially filled with gas generating means, and each said chamber including ignition means; and
   internal wall in said housing for dividing the same to form said separate chambers, said wall having a frangible section adapted to rapture in response to gas pressure generated in one of said chambers allowing fluid communication between said chambers.

2. The plural stage air bag inflator of claim 1, wherein:
   said frangible section is strong enough to prevent rupture in response to gas pressure generated in the other of said chambers when said ignition means therein is activated.

3. The plural stage air bag inflator of claim 1, wherein:

said internal wall includes backing for supporting said frangible section on at least one side face of said section.

4. The plural stage air bag inflator of claim 3, wherein:

said backing includes at least one opening for the passage of gas between said chambers.

5. The plural stage air bag inflator of claim 1, wherein:

said internal wall includes a heat insulating means for preventing activation of said gas generating means in one chamber because of heat generated when gas generating means in another chamber is activated.

6. The plural stage air bag inflator of claim 5, wherein:

said internal wall includes structural backing having an opening for the passage of gas between said chambers; and said heat insulating means is supported adjacent at least one side of said backing.

7. The plural stage air bag inflator of claim 6, wherein:

said frangible section of said internal wall is supported on an opposite side of said backing away from said heat insulating means.

8. The plural stage air bag inflator of claim 3, wherein:

said backing includes a perforated structure having an opening for the passage of gas between said chambers; and said frangible section is formed with at least one groove in an opposite face thereof spaced from said backing and defining a fracture line for rupture of said frangible section in response to gas pressure generated in said one chamber.

9. The plural stage air bag inflator of claim 8, wherein:

said backing engages said one side face of said frangible section to support the same against rupture in response to gas pressure generated in another of said chambers.

10. The plural stage air bag inflator of claim 9, wherein:

said one side face of said frangible section is flat and said groove defines a thin wall segment to facilitate fracture of said section in response to gas pressure generated adjacent said one side face.

11. A multiple stage air bag inflator system comprising:

an air bag module, said air ball module including a housing having a plurality of separated chambers, each having a volume, each said volume being substantially filled with gas generating means, and each said chamber including ignition means; and internal wall in said housing for dividing the same to form said separate chambers, said wall having a frangible section adapted to rupture in response to gas pressure generated in one of said chambers allowing fluid communication between said chambers; and electronic control means for controlling each said gas generating means, said electronic control means being responsive to multiple sensed inputs for identifying ignition means to be activated and for identifying a time for activating said identified ignition means.

12. A multiple stage air bag inflator system as recited in claim 11 wherein said housing includes two separated chambers and wherein said control means includes means for identifying whether both ignition means are activated, and means for identifying a time delay between activating a first and a second one of said two ignition means.

13. A multiple stage air bag inflator system as recited in claim 11 wherein said housing includes two separated chambers and wherein said control means includes means for identifying whether a first and a second one of said two ignition means are activated.

14. A multiple stage air bag inflator comprising:

canister means having a plurality of separate chambers of different size;

gas generating means in each chamber;

ignition means in each chamber for igniting said gas generating means;

internal wall means in said canister means between said separate chambers, said wall means including a frangible portion adapted to rupture in response to a difference in gas pressure between said chambers for allowing gas from one of said chambers having a higher pressure to flow into a chamber having a lower pressure for igniting said gas generating means therein.

15. The multiple stage air bag inflator of claim 14, wherein:

said wall means includes annular backing means having a gas opening therein; and said frangible portion comprises a disk on one side of said backing means covering said gas opening until ruptured by said higher gas pressure.

16. The multiple stage air bag inflator of claim 15, wherein:

said one chamber is smaller than a larger of said chambers; and said disk is contained in said larger chamber.

17. The multiple stage air bag inflator of claim 16, including:

spacer means spaced apart from said disk in said larger chamber forming an open space for said disk to move without resistance in response to higher gas pressure in said one chamber.

18. The multiple stage air bag inflator of claim 17, wherein:

said spacer means is engageable with said gas generating means on a side facing away from said disk.

19. The multiple stage air bag inflator of claim 16, including:

heat insulation means adjacent said internal wall means for minimizing heat transfer between said chambers.

20. The multiple stage air bag inflator of claim 19, wherein:

said heat insulation means is mounted adjacent said backing means on a side thereof opposite said disk.

* * * * *

UNITED STATES PATENT AND TRADEMARK OFFICE
CERTIFICATE OF CORRECTION

PATENT NO. : 5,564,743
DATED : October 15, 1996
INVENTOR(S) : Brent R. Marchant

It is certified that error appears in the above-indentified patent and that said Letters Patent is hereby corrected as shown below:

At column 6, line 56, "each same volume" should be
--each said volume--.

At column 6, line 59, "internal wall" should be
--an internal wall--.

At column 7, line 46, "air ball module" should be
--air bag module--.

At column 7, line 50, "and internal wall" should be
--and an internal wall--.

At column 7, line 53, "to rapture in response" should be
--to rupture in response--.

Signed and Sealed this

Tenth Day of June, 1997

Attest:

BRUCE LEHMAN

Attesting Officer

Commissioner of Patents and Trademarks

(12) REEXAMINATION CERTIFICATE (4564th)
United States Patent
Marchant

(10) Number: US 5,564,743 C1
(45) Certificate Issued: Apr. 30, 2002

(54) MULTIPLE STAGE AIR BAG INFLATOR SYSTEM

(75) Inventor: Brent R. Marchant, Ogden, UT (US)

(73) Assignee: Autoliv Asp, Inc., Ogden, UT (US)

Reexamination Request:
No. 90/005,912, Jan. 19, 2001

Reexamination Certificate for:
Patent No.: 5,564,743
Issued: Oct. 15, 1996
Appl. No.: 08/408,356
Filed: Mar. 22, 1995

Certificate of Correction issued Jun. 10, 1997.

(51) Int. Cl.[7] .............................................. B60R 21/26
(52) U.S. Cl. ........................... 280/741; 222/3; 280/736; 280/737
(58) Field of Search ................................ 280/736, 737, 280/740, 741, 742; 102/530, 531

(56) References Cited

U.S. PATENT DOCUMENTS

| | | |
|---|---|---|
| 3,866,124 A | 2/1975 | Johnson |
| 3,944,249 A | 3/1976 | Smith et al. |
| 3,972,545 A | 8/1976 | Kirchoff et al. |
| 4,998,751 A * | 3/1991 | Paxton et al. ............... 280/741 |
| 5,033,390 A * | 7/1991 | Minert et al. ............... 280/741 |
| 5,351,988 A * | 10/1994 | Bishop et al. .............. 280/737 |

FOREIGN PATENT DOCUMENTS

| | | | |
|---|---|---|---|
| EP | 0382552 | 8/1990 | |
| JP | 4-146842 | * 5/1992 | ................ 260/736 |

* cited by examiner

*Primary Examiner*—Peter C. English

(57) ABSTRACT

A multi-stage air bag inflator includes a housing with at least two separated chambers, each containing gas generating material and an ignition system for activating the material to generate gas for rapidly filling an associated air bag. An internal wall is provided in the housing to form the separated chambers and the wall has a frangible section designed to rupture in response to a predetermined level of gas pressure in one of the chambers providing fluid communication between the chambers. The frangible section is supported against rupture in response to gas pressure in the other gas chamber so that different levels of air bag inflation with gas are possible in response to the severity of the impact.

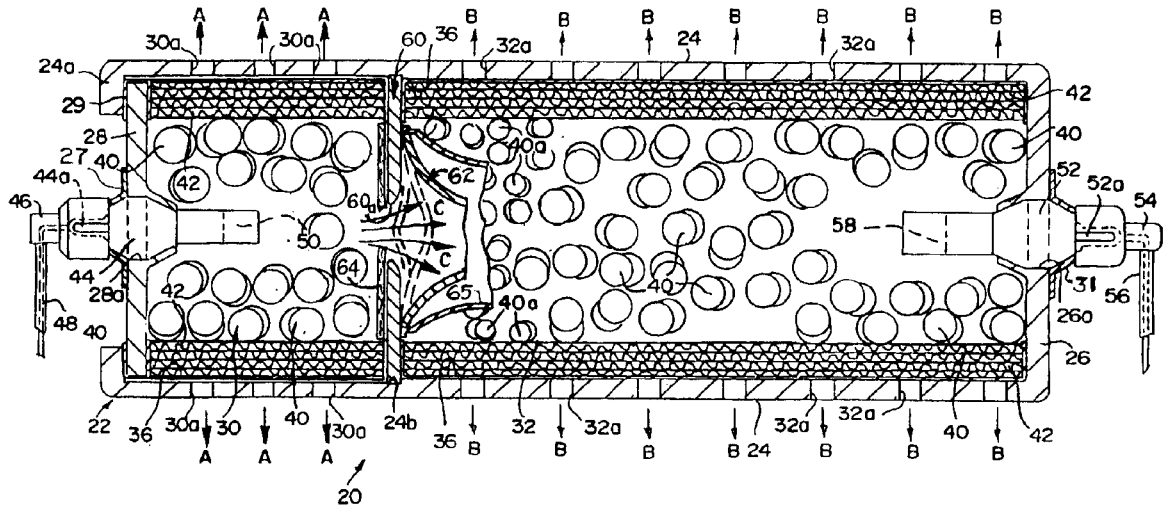

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

\* \* \* \* \*